US011507342B1

(12) United States Patent
Agrawal et al.

(10) Patent No.: US 11,507,342 B1
(45) Date of Patent: Nov. 22, 2022

(54) ELECTRONIC DEVICE WITH AUTOMATIC PRIORITIZATION AND SCHEDULING OF SPEAKERS IN A MULTIPLE PARTICIPANT COMMUNICATION SESSION

(71) Applicant: MOTOROLA MOBILITY LLC, Wilmington, DE (US)

(72) Inventors: Amit Kumar Agrawal, Bangalore (IN); Olivier D Meirhaeghe, Lincolnshire, IL (US); Rahul B. Desai, Hoffman Estates, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 17/346,451

(22) Filed: Jun. 14, 2021

(51) Int. Cl.
*H04N 7/15* (2006.01)
*G06F 3/16* (2006.01)
*G06V 40/20* (2022.01)

(52) U.S. Cl.
CPC .............. *G06F 3/165* (2013.01); *G06V 40/20* (2022.01); *H04N 7/15* (2013.01)

(58) Field of Classification Search
CPC .... G06F 3/16; G06K 9/00; H04N 7/15; H04L 65/4046; H04L 65/403
USPC ........................................... 348/14.01–14.16
See application file for complete search history.

(56) References Cited

U.S. PATENT DOCUMENTS

| 7,617,457 | B2 | 11/2009 | Kortum et al. |
| 8,739,045 | B2 | 5/2014 | Pang |
| 9,071,692 | B2 | 6/2015 | Sanaullah et al. |
| 9,516,268 | B2 | 12/2016 | Heda et al. |
| 2001/0054070 | A1* | 12/2001 | Savage ............... H04L 65/4076 709/204 |
| 2014/0022332 | A1* | 1/2014 | Wang ..................... H04N 7/157 348/14.07 |
| 2014/0071223 | A1 | 3/2014 | Chatterjee |
| 2014/0379351 | A1 | 12/2014 | Raniwala |
| 2016/0104094 | A1* | 4/2016 | Yom-Tov ............. G06Q 10/109 705/7.41 |
| 2016/0255126 | A1 | 9/2016 | Sarris |
| 2016/0381720 | A1* | 12/2016 | Baek ....................... H04W 8/14 370/329 |
| 2018/0358034 | A1 | 12/2018 | Chakra et al. |
| 2020/0178045 | A1* | 6/2020 | Sung ..................... H04M 3/566 |
| 2021/0014455 | A1* | 1/2021 | Gorny .................. H04M 3/567 |

\* cited by examiner

*Primary Examiner* — Melur Ramakrishnaiah
(74) *Attorney, Agent, or Firm* — Isidore PLLC

(57) ABSTRACT

An electronic device, computer program product, and method prioritizes communication between participants in a communication session. A controller configures the electronic device to identifying participants, each respectively using a second electronic device to participate in the communication session. The controller associates a priority rank for each of the participants. The controller monitors for an indication from each of the second electronic devices that a corresponding participant among the participants is attempting to speak to the other participants during the communication session. In response to receiving two or more indications, the controller compares the respective priority ranks of the participants corresponding to the two or more indications. The controller selects the audio stream received from the second electronic device of the particular participant having a highest priority. The controller presents the audio stream to the other participants.

20 Claims, 7 Drawing Sheets

US 11,507,342 B1

ELECTRONIC DEVICE WITH AUTOMATIC PRIORITIZATION AND SCHEDULING OF SPEAKERS IN A MULTIPLE PARTICIPANT COMMUNICATION SESSION

BACKGROUND

1. Technical Field

The present disclosure relates generally to electronic devices that support/enable video communication sessions using a camera and a microphone, and more particularly to electronic devices that support/enable video communication sessions and having a microphone that can be muted and unmuted during the communication session.

2. Description of the Related Art

User communication devices such as mobile phones, desktop workstations, laptops, and tablets are often equipped with a front side camera and a microphone to enable online human communication. Audio or video communication sessions are increasingly set up for a large number of participants that each use an electronic device. The communication session can replicate a seminar, a panel discussion, an organizational meeting, and other formats. Although electronic devices enable each participant to communicate with the other participants, enabling an orderly intercourse of speaking can be challenging. Conventionally the participants have to follow guidelines to participate appropriately, or the host needs to mute the participants to prevent interruptions. These approaches fall far short of the necessary interaction or decorum of particular types of communication sessions.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
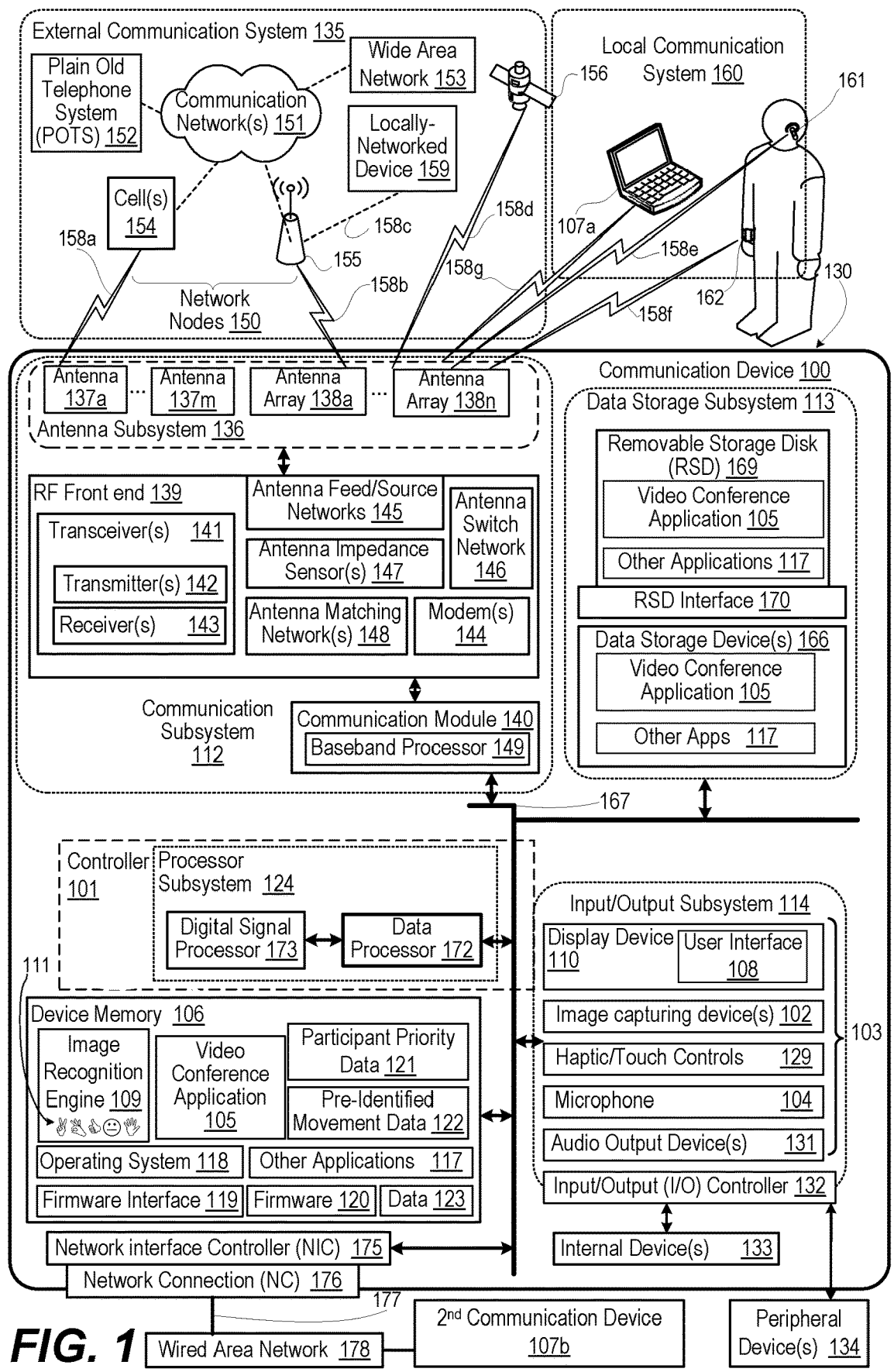
FIG. 1 depicts a functional block diagram of a communication environment of a communication device that manages a multi-party communication session by prioritizing participants for speaking participation using respective second communication devices, and within which the features of the present disclosure are advantageously implemented, according to one or more embodiments.

According to aspects of the present disclosure, an electronic device, computer program product, and method prioritizes communication between participants in a communication session when more than one remote participant attempts to speak at the same time. A controller configures the electronic device to identify one or more participants, each respectively using a second electronic device to participate in the communication session. The controller associates a priority rank for each of the one or more participants. The controller monitors for an indication from each of the one or more second electronic devices that a corresponding participant among the one or more participants is attempting to speak to the other participants during the communication session. In response to receiving two or more indications, the controller compares the respective priority ranks of the participants corresponding to the two or more indications. The controller selects the audio stream received from the second electronic device of the particular participant having a highest priority and presents that audio stream to the other participants.

In one or more aspects, the present disclosure provides for an improved user experience during a communication session between the electronic device and one or more second electronic devices by prioritizing when participants can speak. The communication session can be audio only or can include shared video from at least one of the electronic device and the one or more second electronic devices. Certain participants are organizationally entitled to a priority based on organization hierarchy or role in the communication session. Certain participants may not be entitled to speak or require permission to speak to avoid nuisance interruptions. Rankings assigned to the participants affect the extent to which the participants can actively contribute to the discussion or presentation during the communication session. In an example, the ranking is pre-defined and based on hierarchy of participants within an organization or assigned roles during the communication session. In another example, the ranking and the associated speaking priority are dynamically scored whereby useful contributions of a participant raise the priority of the participant and nuisance interruptions lower the priority of the participant. As an example, peer ratings can raise or lower the priority of the participant. In yet another example, the quantity of participations dynamically affects the ranking of each participant as a counterbalance to those participants tending to monopolize the discussion time. The rankings can be used to prevent a particular participant from speaking or to prioritize one participant over another. As a participant speaks for a longer period of time, the priority ranking for the participant goes down, making it more difficult to regain the floor later in the communication session.

In one or more embodiments, the electronic device monitors the image stream, if available, from the one or more second electronic devices for motions of hands or mouth of the remote participant that may indicate an attempt or desire to speak. The one or more second electronic devices can be hard muted at the second electronic device that prevents audio input from the remote participant from being transmitted to the electronic device and other second electronic devices. The one or more second electronic devices can be soft muted in that the electronic device can prevent the audio input from the remote participant from being selected as an audio output presented to others in the video communication session. The one or more second electronic devices can be concurrently hard and soft muted.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device within an operating environment, and more particularly communication device 100 within which several of the features of the present disclosure are advantageously implemented. Communication device 100 is managed by controller 101, which is communicatively coupled to image capturing device 102 and to at least one user interface device 103 that includes at least one microphone 104 that allow a host participant using communication device 100 to be an active participant. Controller 101 is also communicatively coupled to at least one display device 110, which is an example user interface device 103. Controller 101 executes video conference application 105 stored in device memory 106 to configure communication device 100 to enable communication between participants in a video communication session. Communication device 100 is configured to autonomously provide notification(s) on user interface 108 of at least one display device 110 when a remote participant attempts to speak via a respective second electronic device 107a/107b that is at least one of hard muted and soft muted. It is appreciated that second electronic device 107a/107b can be similarly configured and/or provide similar functionality as communication device 100. According to one or more embodiments, controller 101 monitors, during a communication session with one or more second communication devices 107a-107b, an image stream received from one or more second communication devices 107a-107b for specific movements and/or gestures by a remote participant in the communication session using image recognition engine 109. As an example, image recognition engine 109 can be a neural net that is trained to recognize anatomical features including facial features and hand movements. As another example, image recognition engine 109 can have a library objects 111 of objects that are used to compare to images. As an additional example, image recognition engine 109 can perform a two-dimensional correlation with library objects 111.

Controller 101 associates a priority rank for each of the one or more participants. Controller 101 receives indications from image recognition engine 109 whether movements by two or more particular remote participant are detected that are associated with an attempt to speak to other participants during the communication session. In response to receiving two or more indications, controller 101 compares the respective priority ranks of the participants corresponding to the two or more indications, selects the audio stream received from the second electronic device of the particular participant having a highest priority and presents that audio stream to the other participants. In one embodiment, the other audio stream is queued for later and an indication provided to the respective participant that they will be permitted to speak at a later time. When two or more participants have a similar priority level, selection of one participant over the other is made based on a secondary criteria or random selection.

Each of communication device 100 and second communication devices 107a-107b can be one of a host of different types of devices, including but not limited to, a mobile cellular phone, satellite phone, or smart-phone, a laptop, a net-book, an ultra-book, a networked smart watch, or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring to the specific component makeup and the associated functionality of communication device 100 of FIG. 1. In one or more embodiments, communication device 100 has device memory 106, communication subsystem 112, data storage subsystem 113, and input/output (I/O) subsystem 114. Device memory 106 and each subsystem (112, 113, and 114) are managed by controller 101. Device memory 106 includes program code for applications, such as video conference application 105, and other application(s) 117. Device memory 106 further includes operating system (OS) 118, firmware interface 119, such as basic input/output system (BIOS) or Uniform Extensible Firmware Interface (UEFI), and firmware 120. Device memory 106 includes participant priority data 121, pre-identified movement data 122 and other computer data 123 used by video conference application 105. Examples of participant priority data 121 include organizational hierarchy, assigned role in communication session, peer rating, and participation metrics. Examples of pre-identified movement data 122 can include dimensions of mouth opening and timing of mouth movements that continue for a minimum amount of time. Additional examples of pre-identified movement data 122 can include finger positioning and directions of movement of the fingers, the hand, or the arm.

Controller 101 includes processor subsystem 124 that executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of video conference application 105 and other applications 117 to configure communication device 100 to perform specific functions.

I/O subsystem 114 includes user interface components such as image capturing device 102, microphone 104, display device 110, touch/haptic controls 129, and audio output device(s) 131. I/O subsystem 114 also includes I/O controller 132. I/O controller 132 connects to internal devices 133, which are internal to housing 130, and to peripheral devices 134, such as external speakers, which are external to housing 130 of communication device 100. Internal devices 133 include computing, storage, communication, or sensing components depicted within housing 130. I/O controller 132 supports the necessary configuration of connectors, electrical power, communication protocols, and data buffering to act as an interface between internal devices 133 and peripheral devices 134 and other components of communication device 100 that use a different configuration for inputs and outputs.

Communication subsystem 112 of communication device 100 enables wireless communication with external communication system 135. Communication subsystem 112 includes antenna subsystem 136 having lower band antennas 137a-137m and higher band antenna arrays 138a-138n that can be attached in/at different portions of housing 130. Communication subsystem 112 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 112 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 112, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cellular "cells", base nodes, or base stations 154 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 112 can receive OTA communication from location services such as provided by global positioning system (GPS) satellites 156. Communication subsystem 112 communicates via OTA communication channel(s) 158a with base stations 154. Communication subsystem 112 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 112 communicates with one or more locally networked devices 159 via wired or wireless link 158c provided by access node 155. Communication subsystem 112 receives downlink broadcast channel(s) 158d from GPS satellites 156 to obtain geospatial location information.

In one or more embodiments, controller 101, via communication subsystem 112, performs multiple types of OTA communication with local communication system 160. In one or more embodiments, local communication system 160 includes wireless headset 161 and smart watch 162 that are coupled to communication device 100 to form a personal access network (PAN). Communication subsystem 112 communicates via low power wireless communication channel(s) 158e with headset 161. Communication subsystem 112 communicates via second low power wireless communication channel(s) 158f, such as Bluetooth, with smart watch 162. In one or more particular embodiments, communication subsystem 112 communicates with second communication device(s) 107a via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of applications such as video conference application 105 and other application(s) 117 that use communication services. These applications can be loaded into device memory 106 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as code for video conference application 105 and other applications 117. When executed by controller 101, the program code causes or configures communication device 100 to provide the user interface functionality for video communication sessions described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. In one or embodiments that are not depicted, controller 101 can further include distributed processing and control components that are external to housing 130 or grouped with other components, such as I/O subsystem 114. Data processor 172 is communicatively coupled, via system interlink 167, to device memory 106. In one or more embodiments, controller 101 of communication device 100 is communicatively coupled via system interlink 167 to communication subsystem 112, data storage subsystem 113, and I/O subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

In one or more embodiments, I/O subsystem 114 includes network interface controller (NIC) 175 with a network connection (NC) 176 on housing 130. Network cable 177 connects NC 176 to wired area network 178. Wired area network 178 can be a local area network (LAN), a campus area network (CAN), a metropolitan area network (MAN), or a wide area network (WAN). For example, NC 176 can be an Ethernet connection. Second communication devices 107b is presented communicatively couple to wired area network 178.

Figure 2A:
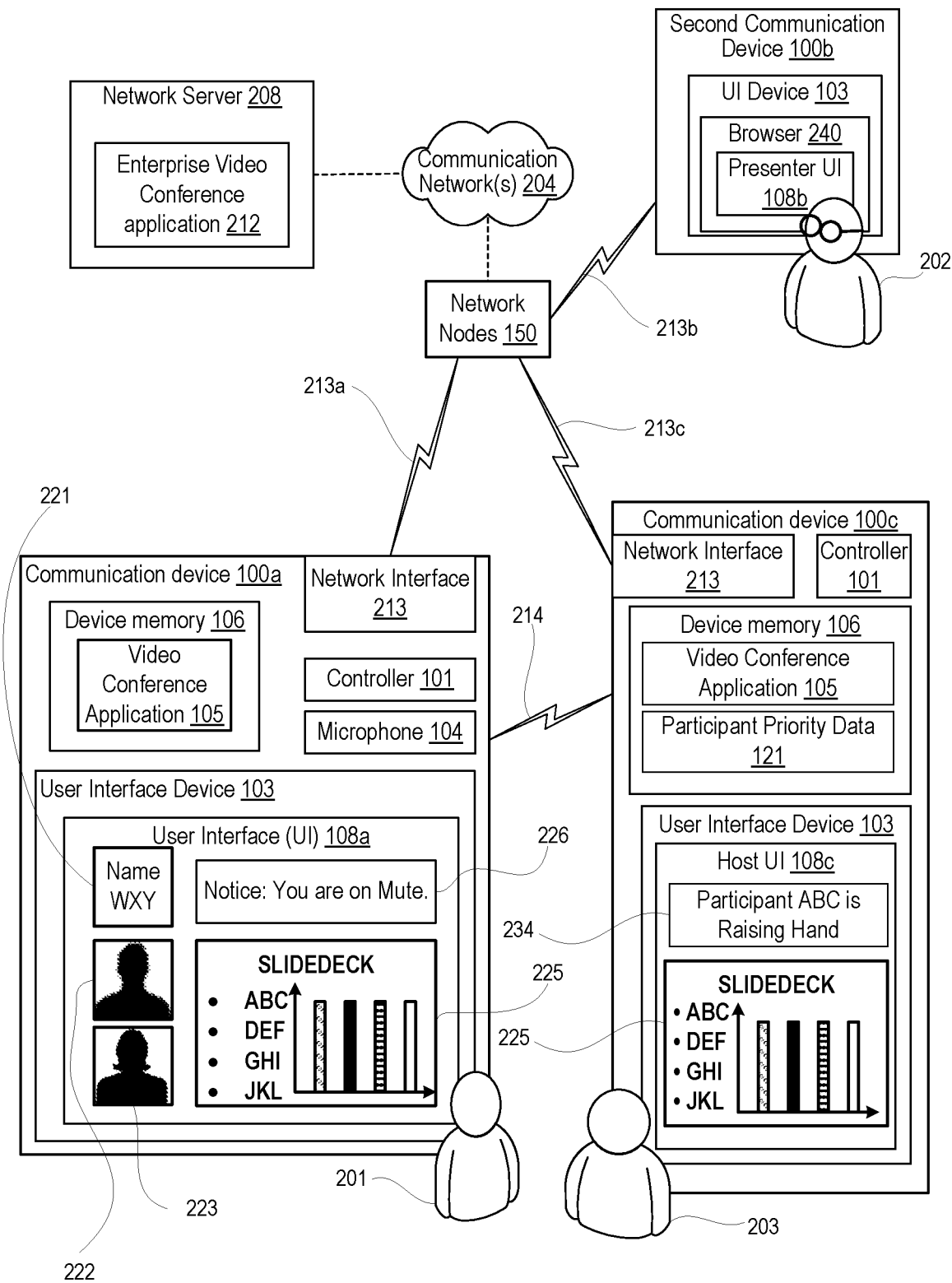
FIG. 2A depicts a functional block diagram of a communication system that supports a video communication session between two or more communication devices, according to one or more embodiments.

FIG. 2A depicts a functional block diagram of communication system 200 that supports a video communication session between first communication device 100a used by non-presenting participant 201, second communication device 100b used by presenter participant 202, and third communication device 100c used by host participant 203. First, second, and third communication devices 100a-100c are communicatively coupled via network 204 during a video communication session. In one or more embodiments, network server 208 executes enterprise video conference application 212 that facilitates setup of video conference sessions. In one or more embodiments enterprise video conference application 212 provides an interface between communication networks 151. Communication devices 100a-100c, managed by respective controllers 101, connect via local network interfaces 213, to network nodes 150 via over-the-air communication channels 213a-213c. In one or more embodiments, communication devices 100a, 100c can connect via ad hoc network connection 214. Communication devices 100a, 100c each execute video conference application 105 stored in respective device memory 106 to present user interfaces 108a, 108c on respective display devices 110. Communication device 100b includes browser 240 that downloads presenter UI 108b to display locally on display device 110b.

Communication device 100a presents user interface 108a for non-presenting participant 201 to interact with. Non-presenting participant 201 is not presenting and is not acting as host. Video conference application 105 customizes user interface 108a for non-presenting participant 201. User interface 108a receives image streams 221-223 from respective image capturing devices 102 of each communication device 100a-100c. In the presented embodiment, image stream 221 includes merely the name of non-presenting participant 201 who has turned off video sharing or whose communication device 100a does not have a working image capturing device 102. User interface 108a includes screen sharing window 225 and alert 226 that indicates that microphone 104 is muted. By monitoring the image stream, video conference application 105 detects an attempt by non-presenting participant 201 to actively participate in the video communication session by speaking.

Host participant 203 interacts with host user interface 108c that can be customized for a participant that has greater control over the video communication session. As an example, device memory receives, maintains, and updates participant priority data 221 associated with each participant 201-203. User interface 108c includes screen sharing window 225 that could be controlled by any of communication device 100a, communication device 100b or communication device 100c. Alert window 234 can provide indications of participants that are attempting to speak, allowing communication device 100c to assist communication device 100b by having host presenter 203 inform participants desiring to speak that they are muted.

Figure 3A:
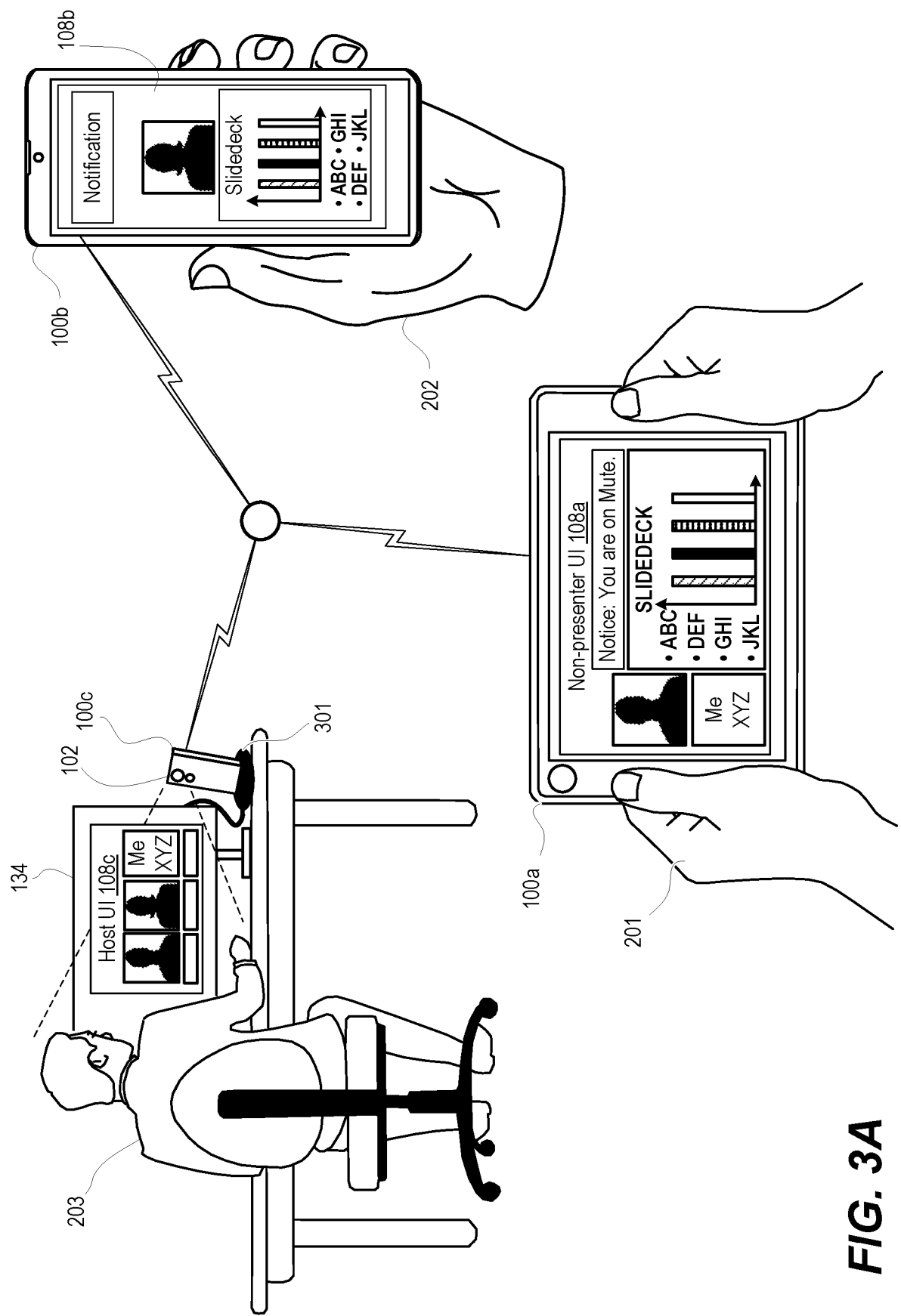
FIG. 3A depicts a front view of three communication devices each presenting a user interface for a video communication session, according to one or more embodiments.

FIG. 3A depicts a front view of three communication devices 100a-100c presenting user interfaces 108a-108c respectively tailored to a current role being played by non-presenting participant 201, presenting participant 202, and host participant 203 for a video communication session. Each of communication devices 100a-100c can be of different types, having some or all of the components of communication device 100 (FIG. 1) in different form factors. Each participant (201-203) can have a priority for presenting during the video communication session that is based on hierarchy ranking, assigned role, or dynamic adjustments made during the video communication session. In the presented example, communication device 100a is a tablet. In one or more embodiments, communication device 100b is a smart phone. Communication device 100c can be a mobile communication device, such as a smart phone, that includes user interface device 103 that presents presenter UI 108b. Communication device 100c can be a mobile communication device, such as a smart phone in dock 301 that is communicatively coupled to a peripheral device 134 (FIG. 1). In one or more embodiments, peripheral device 134 is a monitor of desktop workstation.

With reference to FIG. 2A, communication system 200 includes pre-defined gestures database 250, such as maintained and distributed by network server 208. Participants 201, 203 can create custom gestures and custom spoken words that are used by respective communication devices 100a-100c. In an example, each gesture includes at least two relative positions of the hand. In another example, a gesture can be a recognizable position of the hand, such as pointing upward with the index finger. As an additional example, the gesture can be an exaggerated speaking of "hello" that can be lip read by communication devices 100a-100c.

Figure 2B:
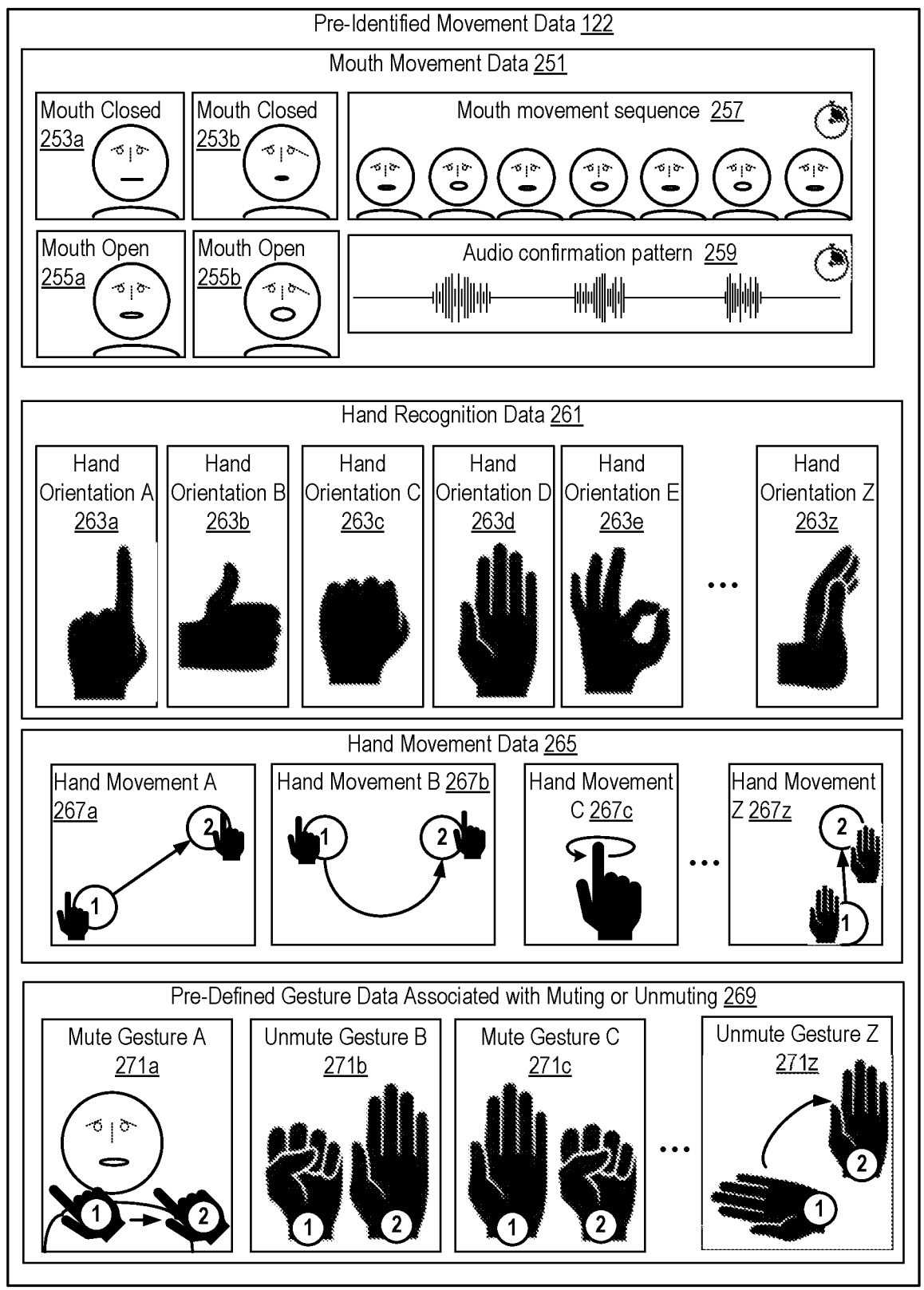
FIG. 2B depicts a diagram of pre-defined movement data stored in memory of the communication device of FIG. 1, according to one or more embodiments.

FIG. 2B depicts a diagram of example pre-defined movement data 122 stored in network server 210, presenter communication device 100b, or host communication device 100c (FIG. 2A). In an example, pre-defined movement data 122 can include mouth movement data 251. Mouth movement data 251 can include first and second mouth closed recognition images 253a-253b that depicts a closed mouth that can be compared to an image live stream. Pre-defined movement data 122 can include first and second mouth open recognition images 255a-255b that depicts an opened mouth that can be compared to the image live stream. Mouth movement sequence 257 defines a minimum number of opening and closing of the mouth during a defined time period that indicates speaking. In one or more embodiments, audio confirmation pattern 259, if available, can be matched to the mouth movement sequence 257 to confirm an attempt to speak by non-presenting participant 201 (FIG. 2A).

Pre-defined movement data 122 can include hand recognition data 261 that can be compared to the image stream to recognize that one or both hands of non-presenting participant 201 are visible within the image stream. In an example, hand orientation A 263a depicts an index finger extended from a left hand. Hand orientation B 263b depicts only a thumb extended from a right hand. Hand orientation C 263c depicts a clenched left fist. Hand orientation D 263d depicts an open left hand. Hand orientation E 263e depicts only left hand making an "OK". Hand orientation Z 263z depicts only thumb-side view of an open left hand.

Pre-defined movement data 122 can include hand movement data 265 that can be compared to the image stream to recognize directional movement(s) of one or both hands of non-presenting participant 201. In an example, hand movement A 267a depicts a hand moving diagonally upward and laterally. Hand movement B 267b depicts a hand moving laterally in a U-shaped curve. Hand movement C 267c depicts an index finger making a twirling motion. Hand movement Z 267z depicts one hand moving upward.

Pre-defined movement data 122 can include pre-defined gesture data 269 that are associated with automatic muting, automatic unmuting, or toggling between muting and unmuting. In an example, mute gesture A 271a describes a slashing motion of an index finger in front of a neck of non-presenting participant 201 (FIG. 2A). Unmute gesture B 271b describes a clenched first unclenching to an open hand. Mute gesture C 271c describes an open hand clenching to a fist. Unmute gesture 271z describes palm out open hand swept in a 90° arc.

Pre-defined movement data 122 can further include rule-based filtering of gesturing. As an example, a gesture that last less than a first threshold period of time, such as two (2) seconds, can be ignored as not being associated with an attempt to speak. As another example, an open hand positioned over the mouth, such as in response to a yawn or a sneeze, can be ignored as not being associated with an attempt to speak. As an additional example, a finger scratching a portion of the face can be ignored as not being associated with an attempt to speak. As a further example, holding up a hand for more than a second threshold of time, such as seven (7) seconds, can be associated with an attempt to speak.

Figure 3B:
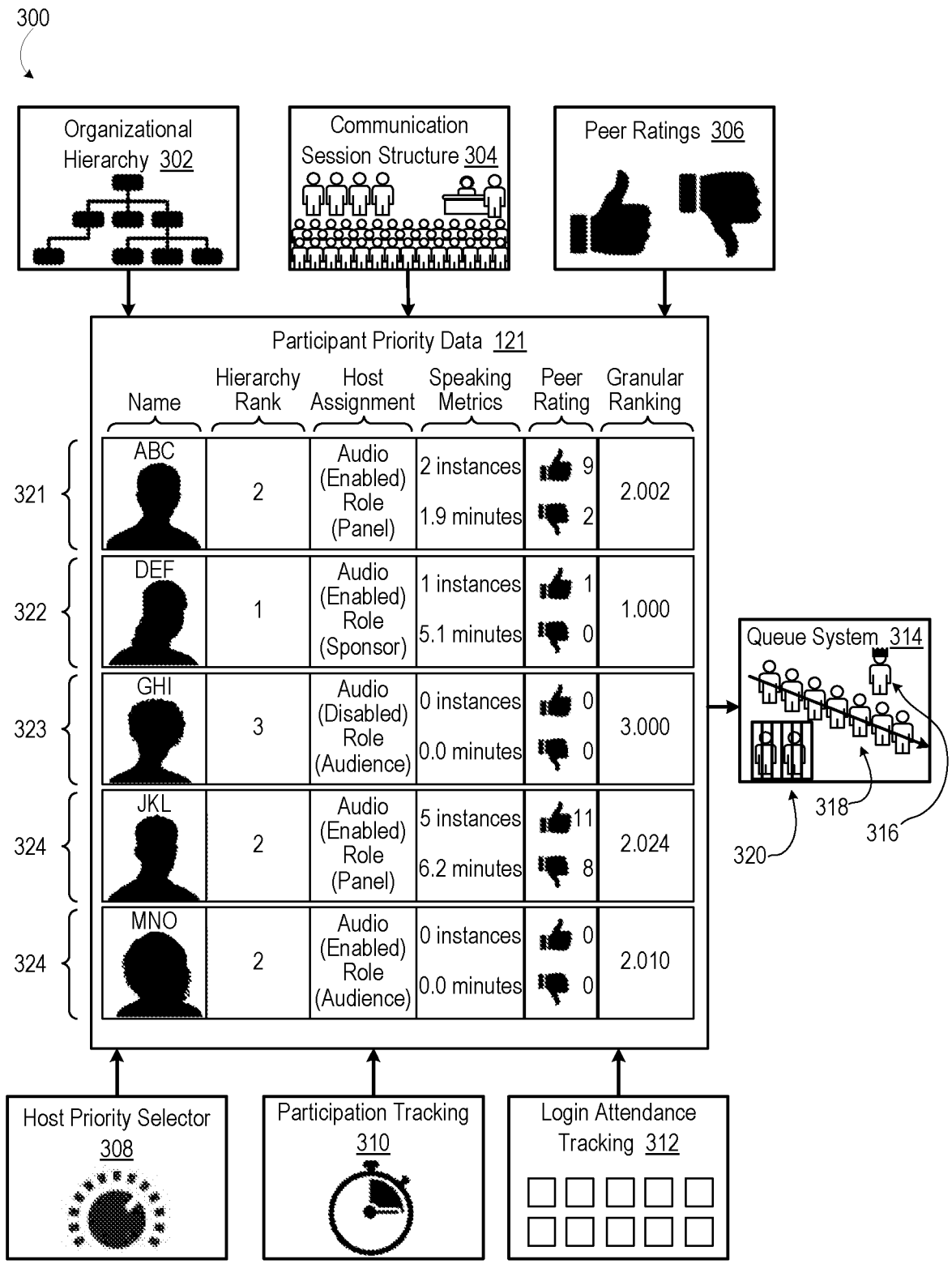
FIG. 3B depicts a data structure diagram of priority inputs used by one or more of a network server and communication devices of FIG. 2A to maintain participant priority data, according to one or more embodiments.

FIG. 3B depicts data structure diagram 300 having inputs (302, 304, 306, 308, 310, and 312) used by one or more of network server 210 (FIG. 2A) and communication devices 100a-100c to maintain participant priority data 121. Inputs to participant priority data 121 can include organization hierarchy data 302, such as provided by an enterprise database. In one or more embodiments, rankings or priority of participants can be statically set based on hierarchy data 302. In one or more embodiments, host participant 203 (FIG. 3A) provides or inputs a communication session structure 304, such as assigning participants to roles as moderator, presenter, audience member, sponsor, and administrator, which can affect the rank or priority of participants. In one or more embodiments, ranking or priority of participants is dynamically adjusted in whole or in part based on participant activity during the communication session. Peer ratings 306 can be accessed from prior communication sessions or obtained during a current communication session. Priorities for participants can be based entirely or in part on adjustments made via host priority selector 308. In one or more embodiments, the host priority selector 308 overrides other rankings or priority. For example, a particular participant can become a nuisance and the host participant can choose to block the particular participant from speaking or can choose to block the participant from connecting to the communication session. In one or more embodiments, host priority selector 308 contributes participation assignments or exclusions that affect the automatically set rankings or priority. For example, assignment of a role in the communication session can move the participant into a different tier such as sponsor, panel member, or audience. Priorities for participants can be based at least in part on participation tracking 310 that captures at least one of a quantity indication and a quality indication of participation in the communication session by each participant. Participation tracking 310 can be utilized for purposes such as providing equal time for participant contribution or quality of contribution. In one or more embodiments, quality is subjectively judged by the other participants or the host participant. Inputs to participant priority data 121 can include login attendance tracking 312 so that prioritization is actively maintained for participants that are currently in attendance. One or more of the inputs (302, 304, 306, 308, 310, and 312) can be weighted and combined to produce queue system 314 for participants designated to speak or who have requested to speak. For example, certain participants 316 can have a sufficiently high rank to speak at any time, such as those having a rank of 1. Some participants 318 are queued by priority rank to speak in turn based on their respective priority, such as having a rank of 2. Specifically, the priority ranking can be used to select one participant among the more than one participant attempting to speak. In one or more embodiments, certain participants 320 can be barred/prevented from speaking, such as by having a rank of 3.

In an example, participant priority data 121 includes five (5) records 321-325 for five active participants ("ABC", "DEF", "GHI", "JKL", and "MNO"). Those with a rank of 1.000 to 1.999 are allowed to speak at any time, even if they intrude upon another person currently speaking. Those with a rank of 2.000 to 2.999 can speak when no one else is speaking, with a tie being resolved by relative ranking within the "2's". Those with a ranking of 3.000 to 3.999 are not allowed to speak. In record 321, ABC has a hierarchy rank of "2", a host assignment setting of Audio (enabled) and an assigned role (panel). Speaking metrics include "2" instances of speaking for a total of 1.9 minutes. Peer ratings include 9 favorable and 2 unfavorable. A priority weighting system in which anyone with a "1" rank in the hierarchy has priority can result in a granular ranking of 2.002 for ABC. Among the participants having a ranking in the "2's", ABC has the highest level priority of 2.002. The granular ranking can be based in part on being designated to have an active role in the communication session, having generally favorable reviews, and having not monopolized the speaking time. Participant DEF has a "1" ranking with host assignment settings for audio (enabled) and role (sponsor). The granular ranking of 1.000 allows participant DEF to have the floor whenever desired by outranking the other participants. In an example, the speaking metrics and peer ratings may be ignored when calculating the granular ranking. Participant GHI has a hierarchy rank of "3" and has a host assignment setting of audio (disabled) and role (audience). The granular ranking of 3.00 prohibits speaking, which results in no peer ratings and no speaking metrics. Participant JKL has an organization hierarchy level of "2" and a host assignment setting of audio (enabled) and role (panel). The granular ranking of 2.024 is the lowest within the participants having a ranking in the three (3) "2's" in the participant priority data 121 due to a relatively large number of unfavorable peer ratings as well as having the most instances of speaking or having spoken for the longest time. Participant MNO has a hierarchy ranking of "2" with host assignment setting of audio (enabled) and role (audience). Even though the role does not anticipate speaking, participant MNO is given a mid-tier granular rating of 2.010 based on the hierarchy ranking with no adjustments based on participation metrics or peer ratings due to lack of measurable participation. In one or more embodiments, different numbers of tiers or categories are implemented. As an example, all individuals can be assigned a priority value within a participant tracking system in which no one entitled to interrupt and no one prohibited from speaking.

Figure 4A:
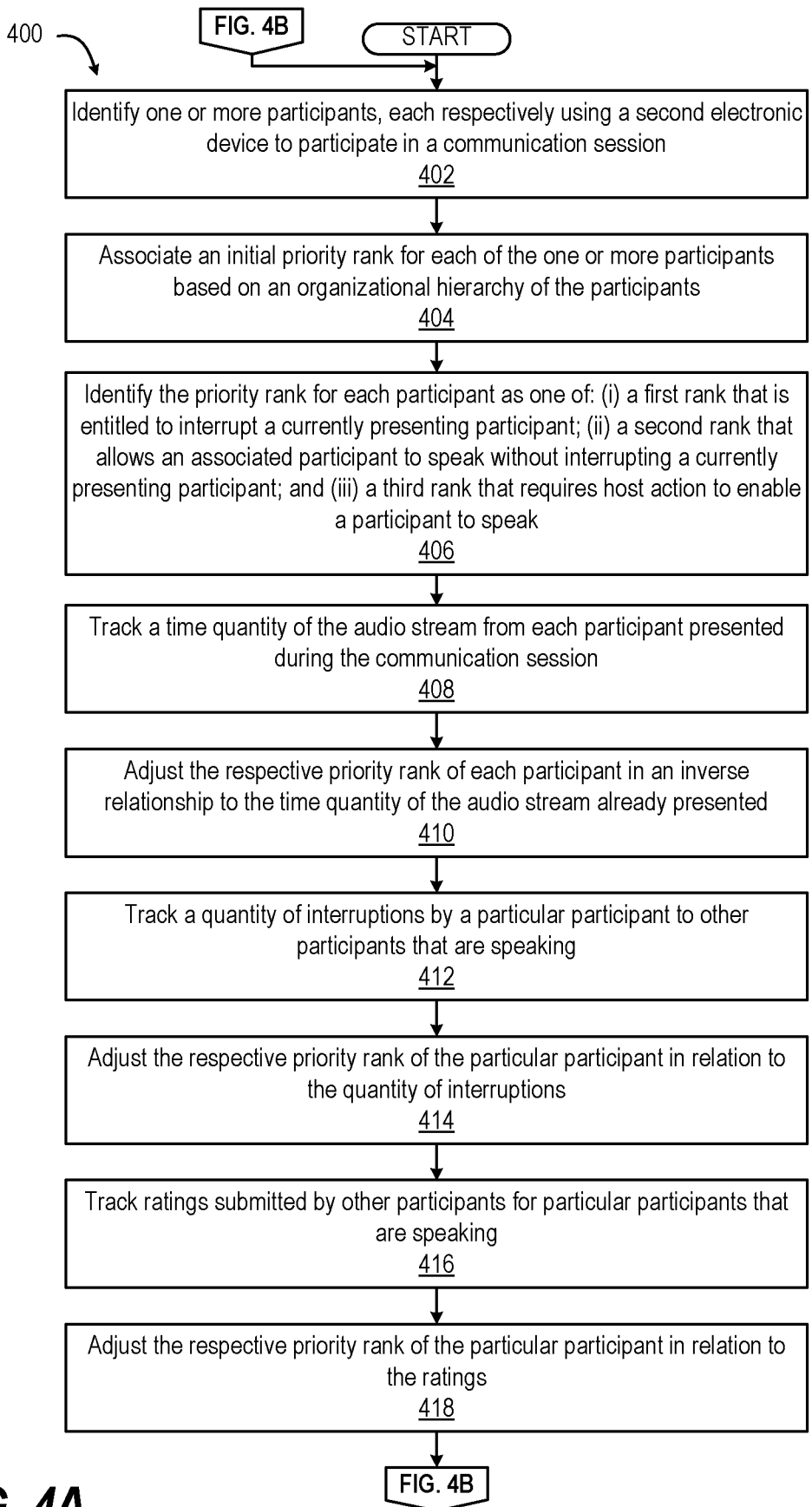
FIGS. 4A-4B (FIG. 4) present a flow diagram of a method for prioritizing participants for verbally communicating within a communication session, according to one or more embodiments.
Figure 4B:
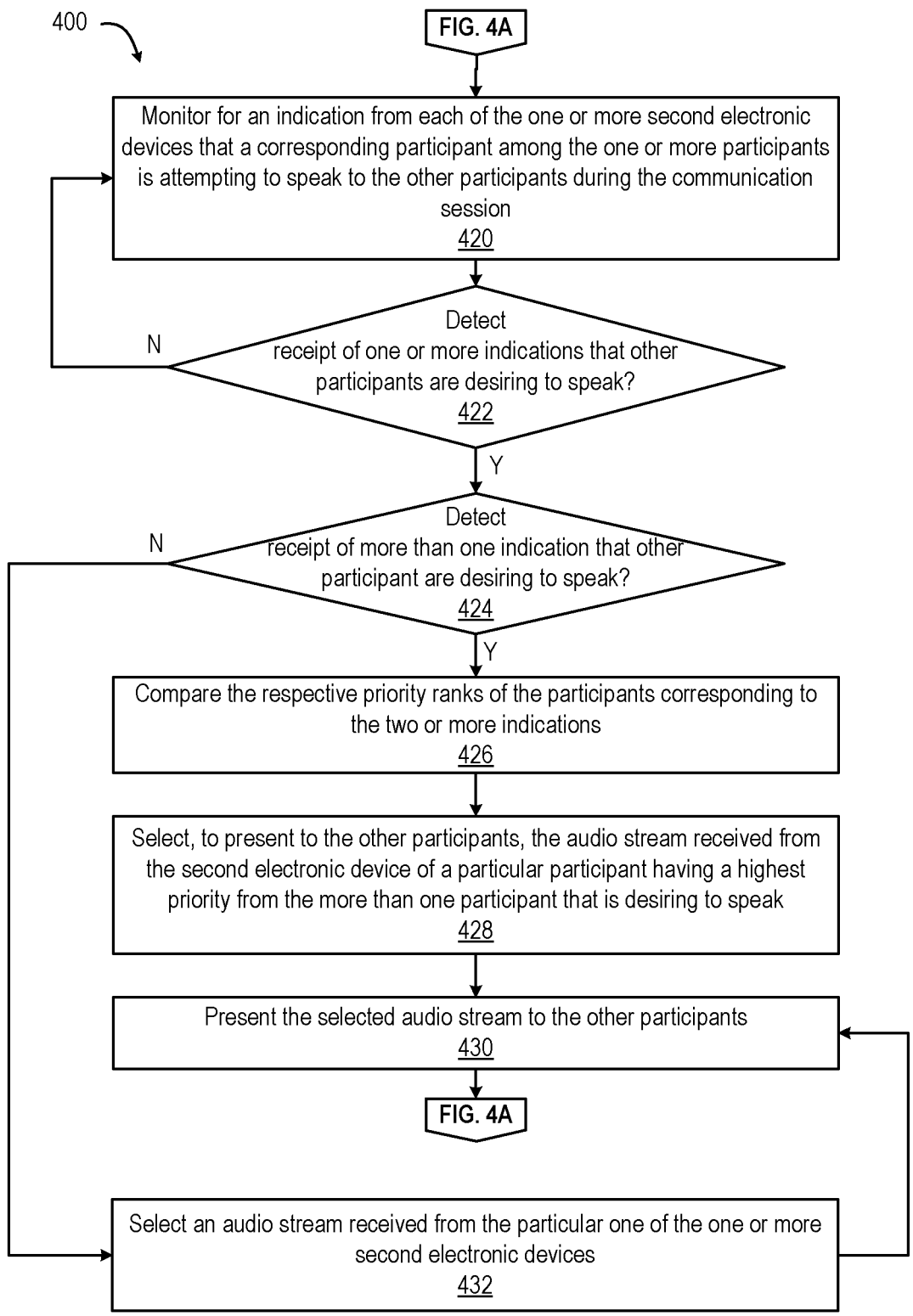

FIGS. 4A-4B (FIG. 4) present a flow diagram of a method for an electronic device, such as communication device 100 (FIG. 1), for prioritizing participants for verbally communicating with in a communication session. In at least one embodiment, communication device 100, managed by controller 101, executes video conference application 105 (FIG. 1) to facilitate the communication session. In one or more embodiments, video conference application 105 (FIG. 1) is implemented by browser 240 (FIG. 2A). Browser 240 is executed by controller 101. Some functionality of the communication session can be executed by network server 208 (FIG. 2A). The description of method 400 is provided with general reference to the specific components illustrated within the preceding FIGS. 1, 2A-2B and 3A-3B, and specific components referenced in method 400 can be identical or similar to components of the same name used in describing preceding FIGS. 1, 2A-2B and 3A-3B.

With reference to FIG. 4A, method 400 includes identifying one or more participants, each respectively using a second electronic device to participate in a communication session (block 402). In one or more embodiments, method 400 includes associating an initial priority rank for each of the one or more participants based on an organizational hierarchy of the participants (block 404). In an example, the organization hierarchy can be obtained from an enterprise personnel system. In an example, the organization hierarchy can be established based on the roles assigned in the current communication session. In one or more embodiments, the initial priority rank can be static during the communication session. In one or more embodiments, the initial priority rank can be dynamically adjusted during the communication session. In one or more embodiments, method 400 includes identifying the priority rank for each participant as one of: (i) a first rank that is entitled to interrupt a currently presenting participant; (ii) a second rank that allows an associated participant to speak without interrupting a currently presenting participant; and (iii) a third rank that requires host action to enable a participant to speak (block 406). Within a ranking, greater granularity of ranking can be achieved by making dynamic changes based on participation in the communication session. For example, among those afforded the second rank, some or all of the participants can have an adjusted priority relative to the others in the second rank. In one or more embodiments, method 400 includes tracking a time quantity (i.e., the amount or length) of audio stream presented from each participant during the communication session (block 408). Method 400 includes adjusting the respective priority rank of each participant in an inverse relationship to the time quantity of the audio stream already presented, respectively (block 410). In one or more embodiments, method 400 includes tracking a quantity of interruptions by a particular participant to other participants that are speaking (block 412). Method 400 includes adjusting the respective priority rank of the particular participant in relation to the quantity of interruptions (block 414). As an example, attempting to speak within three (3) seconds of no one speaking will not be deemed an interruption. Attempting to speak when someone else has been speaking for more than three (3) seconds will be deemed an interruption which increases a counter. With each increment of the counter, the priority ranking of the participant can be lowered.in one or more embodiments, method 400 includes tracking ratings submitted by other participants for particular participants that are speaking (block 416). Method 400 includes adjusting the respective priority rank of the particular participant in relation to the submitted ratings (block 418).

With reference to FIG. 4B, method 400 includes monitoring for an indication from each of the one or more second electronic devices that a corresponding participant among the one or more participants is attempting to speak to the other participants during the communication session (block 420). In one or more embodiments, the indication is based on the controller visually detecting movements of the hands or mouth of the remote participant within the image stream received from the participant's device. Method 400 includes determining whether receipt of one or more indications that other participants are desiring to speak has occurred (decision block 422). In response to determining receipt of one or more indications are not received, method returns to block 420. In response to determining that receipt of one or more indications has occurred, method 400 includes determining whether more than one participant is desiring to speak (decision block 424). In response to determining receipt of more than one indication has occurred, method 400 includes comparing the respective priority ranks of the participants corresponding to the two or more indications (block 426). Method 400 includes selecting, to present to the other participants, the audio stream received from the second electronic device of a particular participant having a highest priority from the more than one participant that is desiring to speak (block 428). Method 400 includes presenting the selected audio stream to the other participants (block 430). Then method 400 returns to block 402 (FIG. 4A). In response to determining that more than one indication is not received (i.e., only one is received) in decision block 424, method 400 includes selecting an audio stream received from the particular one of the one or more second electronic devices (block 432). Then method 400 returns to block 430.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one user interface device; and
   a controller communicatively coupled to the at least one user interface device, and which:
   identifies one or more participants in a communication session, each participant respectively using a second electronic device to participate in the communication session;
   associates a priority rank for each of the one or more participants, the priority rank being associated with one or more of (i) an organizational hierarchy of the one or more participants and (ii) ratings submitted by other participants for particular participants;
   monitors for an indication from each of the one or more second electronic devices that a corresponding participant among the one or more participants is attempting to speak to other participants during the communication session; and
   in response to receiving two or more indications:
   compares the respective priority ranks of the participants corresponding to the two or more indications;
   selects an audio stream received from the second electronic device of the particular participant having a highest priority; and
   presents the selected audio stream via the communication session to the other participants.

2. The electronic device of claim 1, wherein the controller selects an audio stream received from a particular one of the one or more second electronic devices to present to the other participants in response to determining that a single indication is received.

3. The electronic device of claim 1, wherein the controller identifies the priority rank for each participant based on an organizational hierarchy of the participants.

4. The electronic device of claim 1, wherein the controller identifies the priority rank for each participant as one of: (i) a first rank that interrupts a second rank; (ii) a second rank that allows an associated participant to speak without being interrupted; and (iii) a third rank that requires host action to enable a participant to speak.

5. The electronic device of claim 1, wherein the controller:
   tracks a quantity of the audio stream from each participant presented during the communication session; and
   adjusts the respective priority rank of each participant in an inverse relationship to the quantity of the audio stream presented, respectively.

6. The electronic device of claim 1, wherein the controller:
   tracks a quantity of interruptions by a particular participant to other participants that are speaking; and
   adjusts the respective priority rank of the particular participant in relation to the quantity of interruptions.

7. The electronic device of claim 1, wherein the controller:
   tracks the ratings submitted by other participants for particular participants that are speaking; and
   adjusts the respective priority rank of the particular participant in relation to the ratings.

8. A method comprising:
   identifying one or more participants in a communication session, each participant respectively using a second electronic device to participate in the communication session;
   associating a priority rank for each of the one or more participants, the priority rank being associated with one or more of (i) an organizational hierarchy of the one or more participants and (ii) ratings submitted by other participants for particular participants;
   monitoring for an indication from each of the one or more second electronic devices that a corresponding participant among the one or more participants is attempting to speak to the other participants during the communication session; and
   in response to receiving two or more indications:
   comparing the respective priority ranks of the participants corresponding to the two or more indications;
   selecting an audio stream received from the second electronic device of the particular participant having a highest priority; and
   presenting the selected audio stream via the communication session to the other participants.

9. The method of claim 8, further comprising selecting an audio stream received from a particular one of the one or more second electronic devices to present to the other participants in response to determining that a single indication is received.

10. The method of claim 8, further comprising identifying the priority rank for each participant based on an organizational hierarchy of the participants.

11. The method of claim 8, further comprising identifying the priority rank for each participant as one of: (i) a first rank that interrupts a second rank; (ii) a second rank that allows an associated participant to speak without interrupting; and (iii) a third rank that requires host action to enable a participant to speak.

12. The method of claim 8, further comprising:
    tracking a quantity of the audio stream from each participant presented during the communication session; and
    adjusting the respective priority rank of each participant in an inverse relationship to the quantity of the audio stream presented, respectively.

13. The method of claim 8, further comprising:
    tracking a quantity of interruptions by a particular participant to other participants that are speaking; and
    adjusting the respective priority rank of the particular participant in relation to the quantity of interruptions.

14. The method of claim 8, further comprising:
    tracking ratings submitted by other participants for particular participants that are speaking; and
    adjusting the respective priority rank of the particular participant in relation to the ratings.

15. A computer program product comprising:
    a computer readable storage device; and
    program code on the computer readable storage device that when executed by a processor associated with an electronic device, the program code enables the electronic device to provide the functionality of:
    identifying one or more participants in a communication session, each participant respectively using a second electronic device to participate in the communication session;
    associating a priority rank for each of the one or more participants, the priority rank being associated with one or more of (i) an organizational hierarchy of the one or more participants and (ii) ratings submitted by other participants for particular participants;
    monitoring for an indication from each of the one or more second electronic devices that a corresponding participant among the one or more participants is attempting to speak to the other participants during the communication session;

in response to receiving two or more indications:

comparing the respective priority ranks of the participants corresponding to the two or more indications; and selecting, to present to the other participants, the audio stream received from the second electronic device of the particular participant having a highest priority;

selecting an audio stream received from a particular one of the one or more second electronic devices to present to the other participants in response to determining that a single indication is received; and presenting the audio stream via the communication session to the other participants.

16. The computer program product of claim 15, wherein the program code enables the electronic device to provide the functionality of identifying the priority rank for each participant based on an organizational hierarchy of the participants.

17. The computer program product of claim 15, wherein the program code enables the electronic device to provide the functionality of identifying the priority rank for each participant based on an organizational hierarchy of the participants as one of: (i) a first rank that interrupts a second rank; (ii) a second rank that allows an associated participant to speak without interrupting; and (iii) a third rank that requires host action to enable a participant to speak.

18. The computer program product of claim 15, wherein the program code enables the electronic device to provide the functionality of:

tracking a quantity of the audio stream from each participant presented during the communication session; and adjusting the respective priority rank of each participant in an inverse relationship to the quantity of the audio stream presented, respectively.

19. The computer program product of claim 15, wherein the program code enables the electronic device to provide the functionality of:

tracking a quantity of interruptions of particular participants to other participants that are speaking; and adjusting the respective priority rank of the particular participant in relation to the quantity of interruptions.

20. The computer program product of claim 15, wherein the program code enables the electronic device to provide the functionality of:

tracking the ratings submitted by other participants for particular participants that are speaking; and adjusting the respective priority rank of the particular participant in relation to the ratings.

* * * * *